United States Patent [19]
Carroll et al.

[11] 4,114,749
[45] Sep. 19, 1978

[54] ROLL CONVEYOR FOR A MACHINE TOOL

[76] Inventors: John C. Carroll, 766 Thompson Rd., N. Syracuse, N.Y. 13212; John M. Carroll, 239 Esther St., Minoa, N.Y. 13116

[21] Appl. No.: 827,474
[22] Filed: Aug. 25, 1977
[51] Int. Cl.² ............................................. B65G 13/12
[52] U.S. Cl. ............................ 193/35 C; 51/103 TF; 51/215 SF
[58] Field of Search ....................... 214/338, 339, 340; 193/35 C; 51/103 R, 103 WH, 103 TF, 215 SF, 236

[56] References Cited
U.S. PATENT DOCUMENTS

| 2,653,720 | 9/1953 | Robertson | 214/339 |
| 3,091,900 | 6/1963 | Whittenberg | 51/236 |
| 3,322,291 | 5/1967 | Smith | 214/339 |

Primary Examiner—Robert G. Sheridan
Attorney, Agent, or Firm—Bruns & Jenney

[57] ABSTRACT

Apparatus for conducting a cylindrical work element towards and away from a machine tool such as a centerless grinder capable of imparting a spiral motion to the work element, the apparatus including a roll conveyor having positionable rolls that are adjustable to produce a relatively deep trough for securely supporting the work element against the action of the tool and to provide a means for coordinating the surface speed of the rolls with that of the work whereby the work is precluded from slipping or sliding over the rolls as it is fed towards or away from the work station of the machine tool.

5 Claims, 3 Drawing Figures

ROLL CONVEYOR FOR A MACHINE TOOL

BACKGROUND OF THE INVENTION

This invention relates to apparatus for conveying a cylindrical work element toward or away from a machine tool, such as a centerless grinder or the like which prevents the surface of the work from being marred while in transit.

More specifically, this invention relates to a roll conveyor for conducting a relatively heavy cylindrical work element through the work station of a cylindrical grinder or the like wherein the tool acts upon the work to provide the moving force for transporting the work element through the work station. As exemplified in U.S. Pat. No. 2,121,388, most roll conveyors for transporting heavy cylindrical elements generally contain two flights of conveyor rolls that are canted at some fixed angle in regard to the axial center line of a work element seated thereupon. A spiral motion is thus imparted to the work that is determined by the amount of cant provided to the conveyor rolls and the diameter of the work element passing thereover. The linear speed of the work moving along the conveyor is therefore directly related to the angle at which the rolls are set in regard to the axial centerline of the work. For any given set of conditions there can be only one linear speed at which the work can move in true rolling contact with the rolls. If the linear speed were to be changed, as for example by the action of a machine tool upon the work, the work would be caused to slide over the rolls rather than rolling in contact therewith.

Under most operating conditions, the noted sliding action of the work in reference to the conveyor rolls will probably have no noticeable effect. However, in the case of a centerless grinder or the like which is adapted to produce a fine finish upon the work surface, the sliding action generates a discernible score mark upon the work that must generally be removed by a final polishing operation. From an economic standpoint this added machine operation is undesirable.

It should also be noted that most conventional roll conveyors for transporting materials are relatively flat devices which provide little or no lateral stability to the article in transit. These conveyors are thus generally incapable of properly supporting a work element in a machine tool. Under the influence of the tool, the unsupported work generally tends to whip about uncontrollable which adversely affects machining operation.

SUMMARY OF THE INVENTION

It is therefore an object of the present invention to improve roll type conveyors for transporting cylindrical work elements along a linear path of travel.

Another object of the present invention is to improve roll conveyors for conducting cylindrical work elements towards and away from the work station of a machine tool.

A still further object of the present invention is to provide a roll conveyor that is capable of being adjusted so that a work element passing thereover is precluded from skipping or sliding over the roll surfaces.

Yet another object of the present invention is to eliminate scoring of a work element that is being conducted over a roll conveyor under the influence of a machine tool.

A still further object of the present invention is to provide a roll conveyor capable of securely supporting a work element while the work element is being acted upon by a machine tool.

These and other objects of the present invention are attained by means of a roll conveyor for conducting a cylindrical workpiece toward or away from a machine tool, such as a centerless grinder, which imparts a spiral motion to the work. The conveyor includes two flights of rolls arranged to support the work therebetween within a relatively deep trough. Each roll in the flight is adjustable so that it can be moved towards or away from the axial center line of the workpiece and can be canted in reference to the axial center line of the work whereby the direction of motion and the velocity of the roll surface is matched with that of the work at the point of contact.

BRIEF DESCRIPTION OF THE DRAWINGS

For a better understanding of the present invention as well as other objects and further features thereof, reference is had to the following detailed description to be read in connection with the accompanying drawings wherein.

DESCRIPTION OF THE PREFERRED EMBODIMENT

Figure 1:
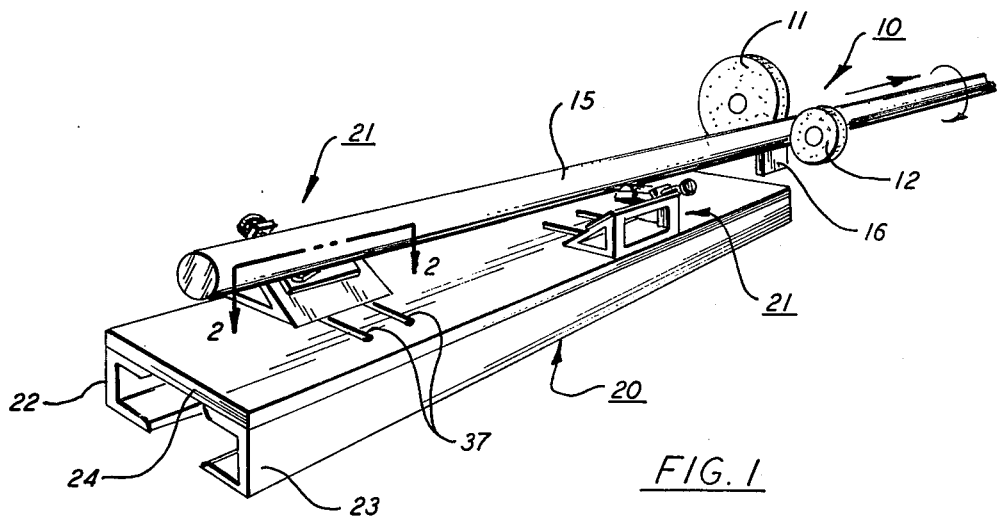
FIG. 1 is a partial view in perspective showing a cylindrical work element being transported through the work station of a cylindrical grinder by means of a roll conveyor embodying the teachings of the present invention.

Referring now to the drawings, and initially to FIG. 1, there is illustrated a work station 10 of a cylindrical grinding machine employing a grinding wheel 11 and a regulating wheel 12 which cooperate to feed a cylindrical workpiece 15 through the work station at a predetermined linear speed. As is typical, the work element is supported within the work zone upon a knife edge support element 16. The main body of the work extends outwardly from the work zone and is supported within a roll conveyor generally referenced 20 embodying the teachings of the present invention.

Basically, the roll conveyor consists of two or more roll assemblies 21 that are adjustably mounted upon a relatively rigid frame consisting of two upright channels 22,23 that are arranged to support a base plate 24 in horizontal alignment thereon. Although the conveyor, as illustrated, contains two roll assemblies positioned on opposite sides of the work element, it should be clear to one skilled in the art that the conveyor will normally be made up of a plurality of roll assemblies that are aligned upon the base plate in parallel flights for supporting work elements of any considerable length therebetween. Although not shown, it should also become evident from the disclosure that a conveyor of similar construction can, and usually is, employed to receive the work as it leaves the work zone of the machine and conducts the work away from the work station.

As indicated by the arrows in FIG. 1, the work element, acting under the action of the grinding tool, is caused to rotate about its central axis while, at the same time, moving linearly through the work station. A helical or spiral motion is thus described by the surface of the work in regard to the stationary conveyor. In practice, the work is supported upon a series of cylindrical rolls as it moves toward or away from the work station. The work, being the driven element, imparts motion to the rolls at the point of contact therebetween. At any given moment in time, the two contacting bodies share an instantaneous center at the point of contact.

In order to have true rolling contact between the workpiece which is describing a helical motion, and the conveyor roll, the conveyor roll must be canted at some angle in reference to the axial centerline of the work so that the magnitude and the direction of the resultant velocity of each body is the same at the point of contact. For any given motion of the work there exists only one position at which the conveyor roll can follow in true rolling contact, that is, a position in which there is no relative motion produced between the two contacting bodies. At any other position, the rolling contact cannot be maintained and the work must slide or be dragged over the surface of the conveyor roll. This sliding or dragging action produces a clearly discernible score line upon the surface of a finished work element which conventionally is removed by an added polishing operation.

Typically, the size of the work element or the speed of the tool will be changed in regard to the specific task the machine is asked to perform. Accordingly, the specific motion described by the work will also change in relation thereto. Conventional roll conveyors which contain rolls that are canted at a fixed angle will thus be unable to accommodate a work element in rolling contact therewith under these various conditions. The present invention is specifically directed towards a conveyor roll that is able to be tuned in regard to the work to provide a rolling contact therebetween while at the same time providing a relatively rigid support for directing the work toward or away from the work along a prescribed path of travel.

Figure 3:
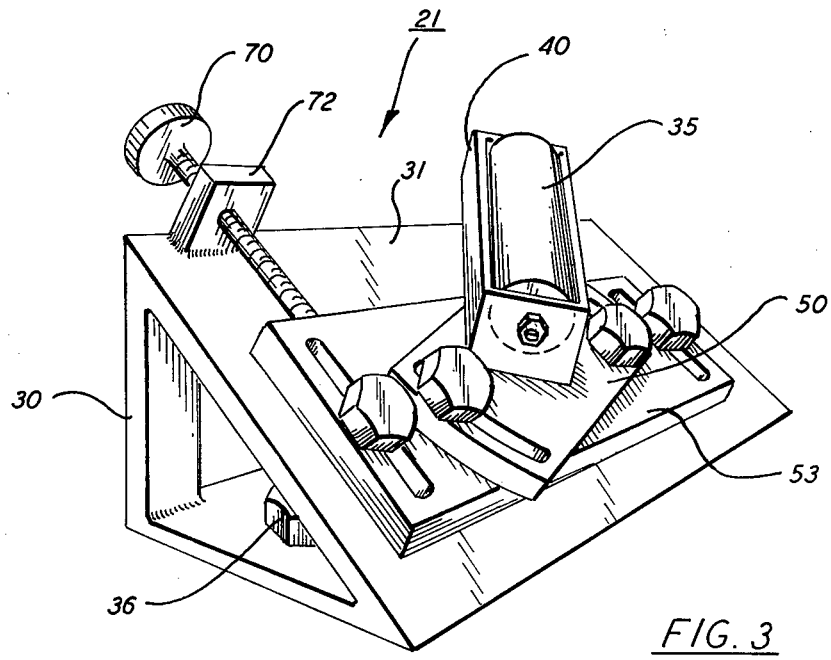
FIG. 3 is a perspective view of the roll assembly shown in FIG. 1 further illustrating the roll adjusting features embodied in the present invention.

In the present apparatus each roll assembly 21 is provided with a supporting bracket 30 having an inclined planar work surface 31 which is arranged to face the work element. The surface 31 forms a relatively steep angle with the base plate, the angle generally being between 30 and 45 degrees. Each cylindrical conveyor roll 35 is adjustably supported upon the work surface so that it can be brought into contact with the work at a point relatively high up on the work surface. In assembly, the two flights of conveyor rolls combine to establish a deep trough in which the workpiece is seated. This, in turn, prevents the work from shifting laterally as it moves along the intended path of travel. As best seen in FIGS. 1 and 3, the bracket 30 is movably secured to the base plate via bolts 36 which are passed through slotted holes 37 provided in the base plate. In operation, the assemblies are moved laterally toward or away from the path of travel of the work so as to accommodate elements of varying diameters therein.

Figure 2:
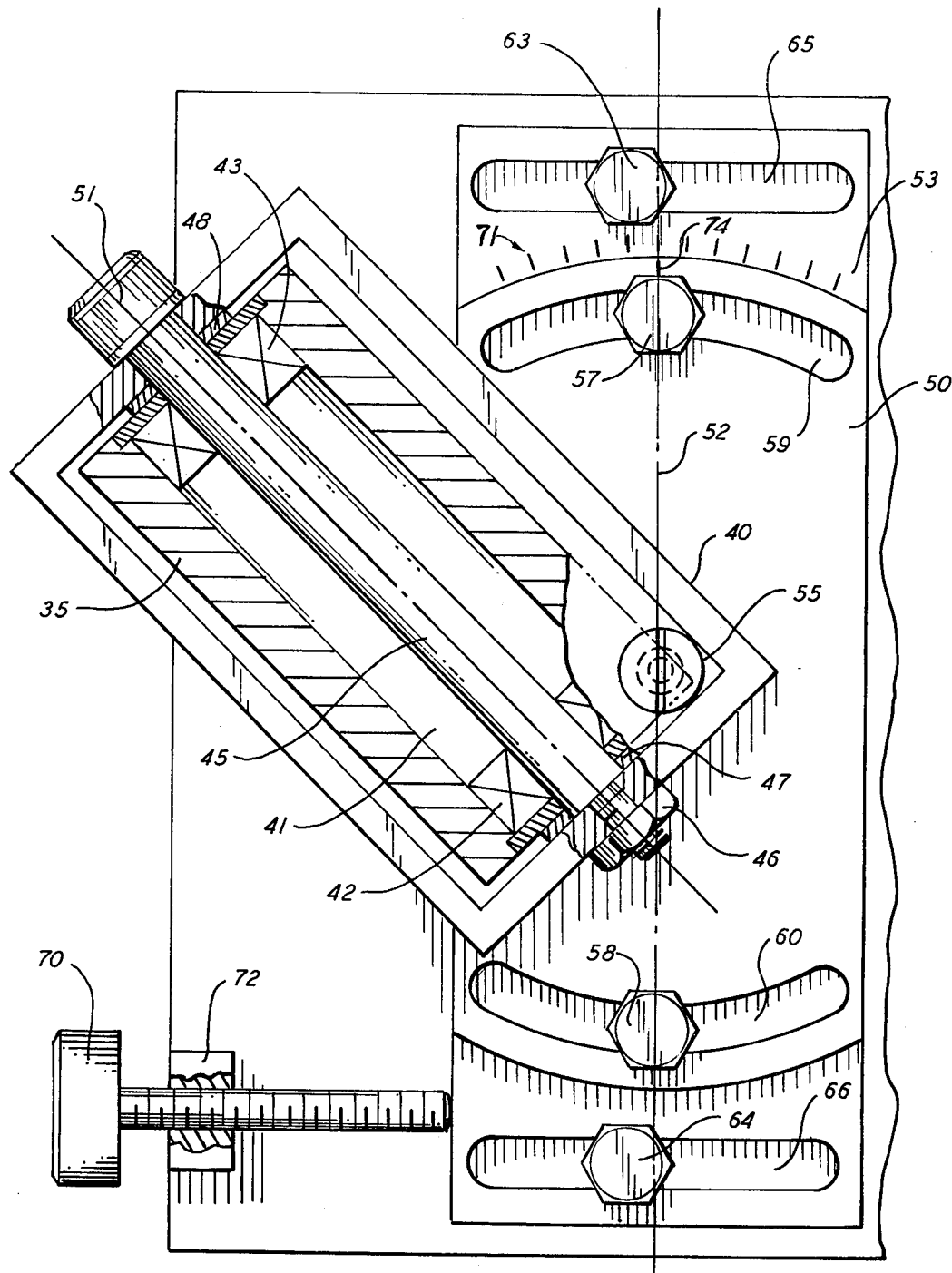
FIG. 2 is an enlarged view taken along lines 2—2 in FIG. 1 with portions broken away further showing the construction of a roll assembly embodying the teachings of the present invention with the workpiece removed.

As best seen in FIG. 2, each conveyor roll 35 is rotatably supported in rectangular shaped housing 40. A central opening 41 is provided in the roll in which two flanged end bearings 42,43 are mounted. A shaft 45, in the form of a stripper bolt 45 is pressed into the inner race of each bearing and the threaded end of the bolt passed through a tapped hole formed in one of the side walls of the housing. A locknut 46 is secured to the threaded end of the bolt and tightened against the housing to lock the assembly in place. A pair of spacers 47,48 are ground to size and inserted between the bearings and the adjacent inner walls of the housing to locate the roll within the housing.

The housing 40 is welded to a rotatable member 50 with the axis 51 of the housing being angularly offset from the axis 52 of the adjustable member. The rotatable member is pivotably mounted upon a slidable support plate 53 by means of a pivot pin 55. A pair of bolts 57,58 which pass through arcuate shaped slotted holes 59,60 are threaded into the support plate 53. Upon loosening the bolts, the rotatable member can be turned about the pivot whereby the cylindrical roll can swing about 45° to either side of the center position as shown in FIG. 2. In effect, this permits the roll to be adjusted from between a 0° and a 90° position in reference to the centerline of the work.

The support plate 53 is slidably mounted upon the work surface of the bracket by means of two bolts 63,64 which pass through parallely aligned slotted holes 65,66 into threaded engagement with the work surface. The slotted holes are perpendicularly aligned with the intended centerline of the work. A thumbscrew 70 is provided by which the support plate can be urged down the inclined plane of the work surface so as to bring the conveyor roll into contact with the work. The thumbscrew is threadably supported in embossed section 72 welded to the work surface and arranged to move into abutting contact against the upper side wall of the support plate, as shown.

In practice, a workpiece is centered within the machine, and thus within the conveyor, by means of levelling blocks or the like. The conveyor rolls are pivoted to the desired angle of cant to provide a rolling contact with the workpiece. This can be accomplished by providing a scale 71 upon the surface of the support plate and an index mark 74 in alignment with the central axis 52 of the rotatable member 50. As explained above, for any given operating condition, the optimum degree of cant of the conveyor roll can be found which will provide the desired rolling contact between the two contacting elements. With the rolls in angular adjustment, the roll is urged down the inclined work surface into touching or supporting engagement with the work. After all of the roll assemblies have been set, the levelling blocks are removed and the work is ready for machining.

While this invention has been described with reference to the structure disclosed herein, it is not confined to details as set forth and this application is intended to cover any modifications or changes as may come within the scope of the following claims.

We claim:

1. A conveyor for conducting cylindrical work elements toward and away from a machine tool which imparts a spiral motion to the work and wherein the work is coaxially aligned with the working centerline of the machine including
   a frame having a planar horizontally aligned bed,
   a series of brackets movably mounted upon said bed to move toward and away from the work along a path of travel normal to the working centerline of the machine, each bracket having an inclined surface facing the work that is parallel with the centerline of the machine and angularly disposed with respect to the bed,
   means to adjustably position the brackets upon the bed, a support plate slidably supported upon the inclined surface of each bracket so that the plates are movable up and down said surfaces, means to adjustably position the support plates upon the inclined surface, a housing pivotably supported upon each of the support plates having a conveyor roll rotatably supported therein for contacting and transporting the work, and means to pivotably position each of said housings upon said support plates so as to angularly position the rolls in respect to the work.

2. The conveyor of claim 1 wherein the brackets are mounted in flights along either side of the centerline of the machine.

3. The conveyor of claim 2 wherein the inclined surface of each bracket is at an angle of between 30° and 45° with the surface of the bed.

4. The conveyor of claim 1 further including an indexing screw mounted upon each of the brackets and being arranged to act against the support plate to slidably position said plate upon the inclined surface of said bracket.

5. The conveyor of claim 1 wherein each conveyor roll is normally mounted at about 45° with respect to the working centerline of the machine, and the housing is adapted to move so as to position the roll to either side of the normal position whereby the roll is positionable between 0° and a 90° position in relation to said working centerline of the machine.

* * * * *